Feb. 1, 1966          A. F. MATAGNE          3,232,166
METHOD OF AND APPARATUS FOR PROJECTING LIGHT IMAGES
Filed March 18, 1960          3 Sheets-Sheet 1
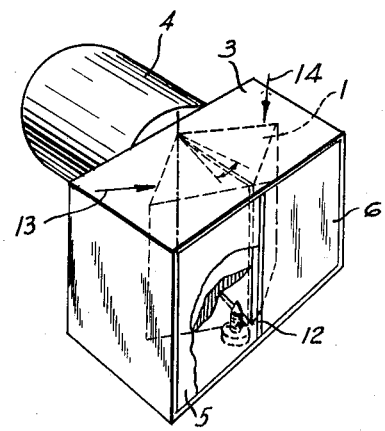
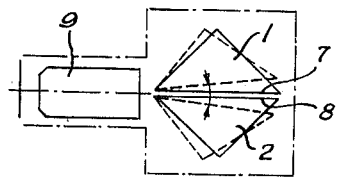
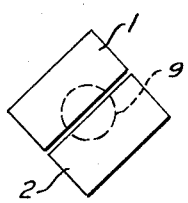
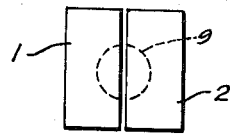
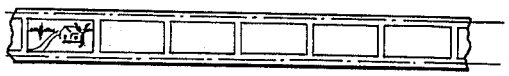
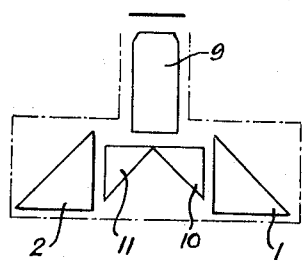
INVENTOR.
A. T. MATAGNE
BY Richards & Geier
ATTORNEYS Feb. 1, 1966  A. F. MATAGNE  3,232,166
METHOD OF AND APPARATUS FOR PROJECTING LIGHT IMAGES
Filed March 18, 1960  3 Sheets-Sheet 2
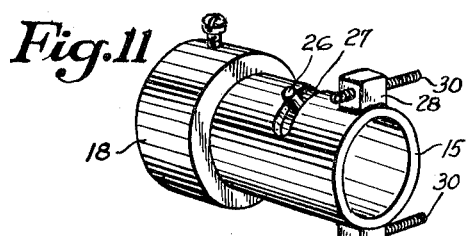
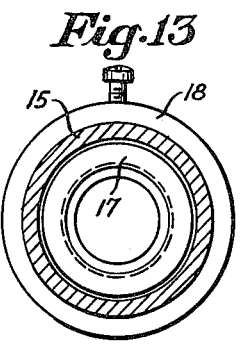
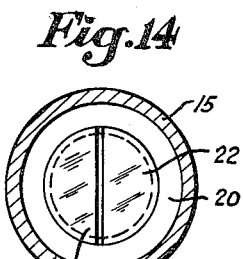
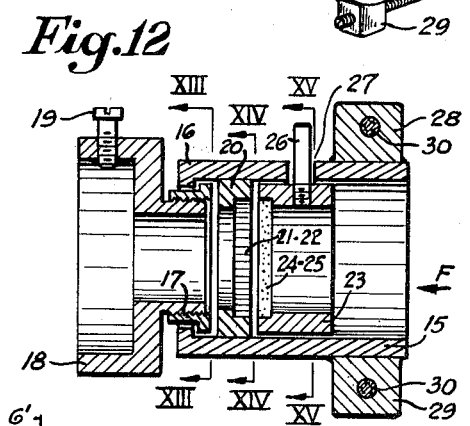
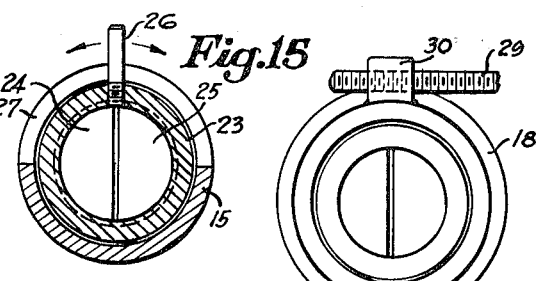
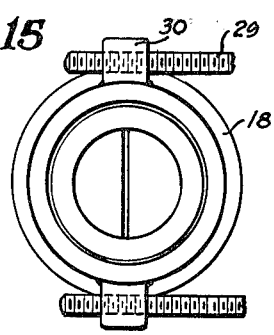
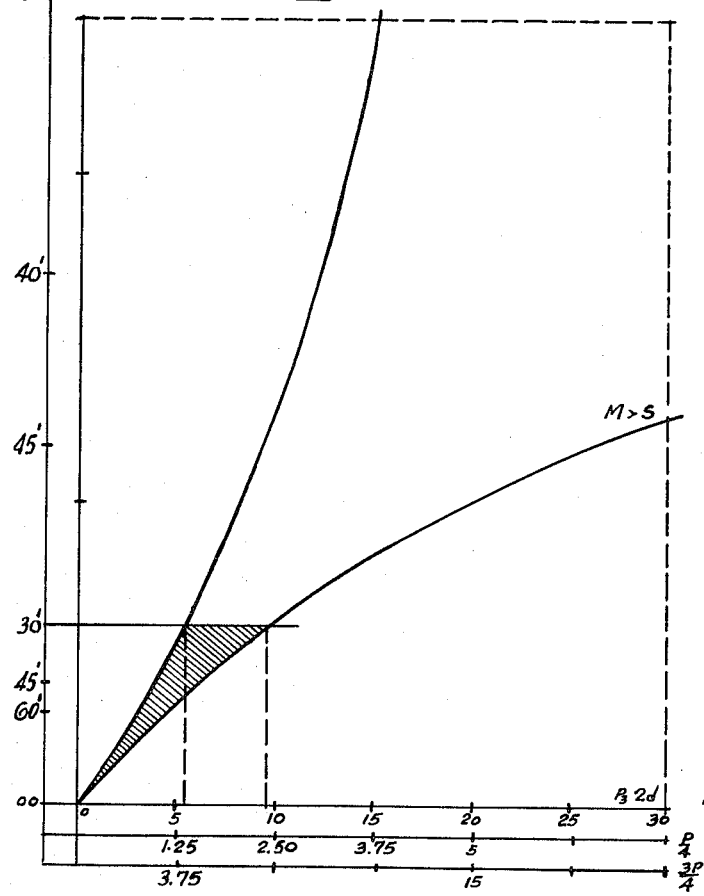
INVENTOR.
A. F. MATAGNE
BY Richards & Geier
ATTORNEYS Feb. 1, 1966    A. F. MATAGNE    3,232,166
METHOD OF AND APPARATUS FOR PROJECTING LIGHT IMAGES
Filed March 18, 1960    3 Sheets-Sheet 3
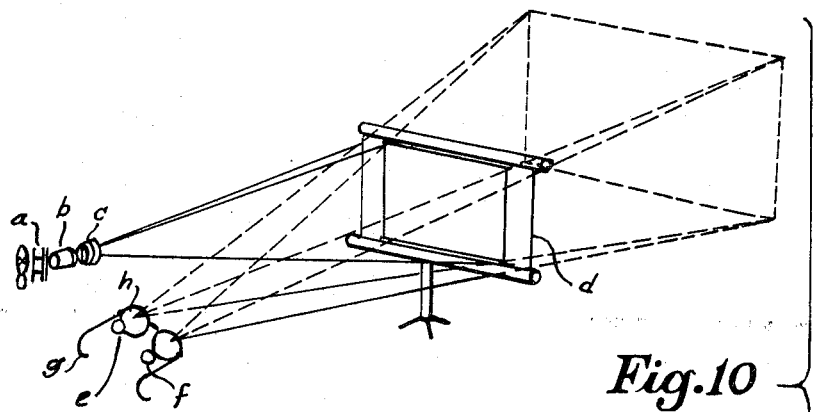
Fig.10
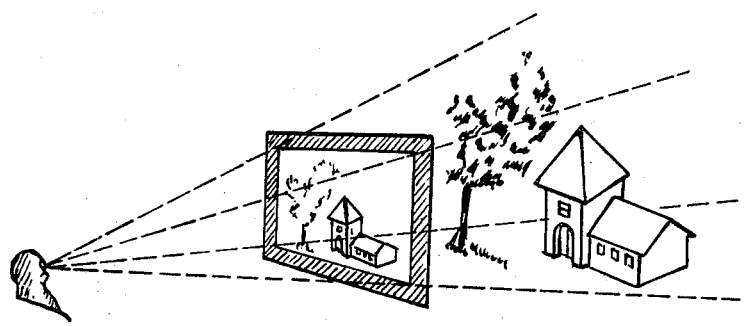
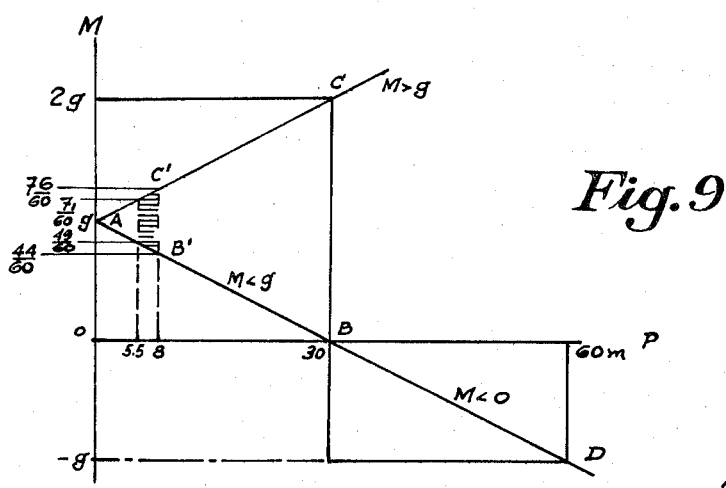
Fig.9
INVENTOR.
A. F. MATAGNE
BY
ATTORNEYS United States Patent Office 3,232,166
Patented Feb. 1, 1966

3,232,166
METHOD OF AND APPARATUS FOR PROJECTING LIGHT IMAGES
Alfred Fulgence Matagne, 44 Passage Lemonnier, Liege, Belgium
Filed Mar. 18, 1960, Ser. No. 15,860
Claims priority, application Belgium, Feb. 24, 1955, 535,959; June 29, 1955, 539,397
1 Claim. (Cl. 88—24)

This invention relates to a method of and an apparatus for projecting light images.

The present application is a continuation-in-part of my co-pending patent application Serial No. 567,309, filed February 23, 1956 with the priority of Belgian patents, Nos. 535,959, filed February 24, 1955 and 539,397, filed June 29, 1955.

Stereoscopic methods known in prior art are based essentially on the principle of the parallax of the eyes. These methods reconstruct three-dimensional perception produced by the parallax of images registered by both eyes in biocular vision by the use of specially constructed projectors which achieve a double projection in two different colors. These images are viewed by an observer through a pair of spectacles having colored glasses related to the colored images.

An object of the invention is to provide a method and simple apparatus which can be fitted directly on the normal objective of existing projection apparatus and which will produce a projection having a novel effect, inasmuch as the screen seems to disappear completely so that the projection appears to be inspace, and provides a remarkable appearance of depth and reality.

Other objects of the present invention will become apparent in the course of the following specification.

The present invention is based essentially on the discovery that a three-dimensional image can be obtained not only by a stereoscopic effect, but also by the so-called space effort or special projection which results from the convergence of the optical axes of the eyes. Consequently, according to this invention the viewer sees the objects at their correct distances by the convergence of the optical axes of the eyes, which is a much more faithful reproduction of actual vision.

Another important distinction is that while in accordance with the stereoscopic effect the viewer sees the objects of an image upon different planes, in accordance with this invention the viewer sees the distances at which the objects are actually located.

In the simplest embodiment of the present invention, an image produced by an ordinary projector is divided into two identical images which are polarized to the extent of 90°, respectively, and are shifted horizontally by a few centimeters. This double image is observed by means of eye glasses which are also polarized to the extent of 90°. Thus, each eye sees actually only one image.

The device can be used for all usual types of pictures projected by the usual projector. To carry out the invention, it is merely necessary to attach to the objective of the usual projector a special attachment containing two identical opposed prisms having very acute angles and vertical edges. Each of the prisms is suitably polarized. Consequently, the device projects two divergent luminous bundles which form upon a screen two identical distant images. The screen is "metalized" so as to preserve its polarization to the reflected light.

The device of the present invention may comprise, for example, at least two prisms or mirrors mounted in a box which can be attached to the lens panel of the projector, the angular spacing between these prisms or mirrors being variable and adjustable, and each prism being disposed opposite to a polarized plate. Instead of two single adjustable prisms, two prisms may be used which are fixed between two other prisms. These different prisms or mirrors may be mounted in a fixed or adjustable manner. The device is mounted on the lens panel, or on any other suitable support, so as to be rotatable around the longitudinal projection axis and be fixable in different characteristic positions according to the film to be projected and the result which it is desired to obtain. In one embodiment of the invention the device comprises a tubular support which can be fixed on the objective and which is fitted interiorly with two semi-circular prisms and, opposite to the latter, two polarizing plates also of semi-circular shape and with a device for angularly displacing the said polarizing plates by rotation around the longitudinal axis of the tubular support. This embodiment is very simple and may be produced or completed by any suitable means.

The invention will appear more clearly from the following more detailed description, with reference to the accompanying drawings, in which:

FIGURE 1 illustrates diagrammatically, in plan view, a device made according to the invention;

FIGURE 2 is a perspective view of the device shown in FIGURE 1;

FIGURES 3, 4 and 5, respectively, illustrate diagrammatically and in front view, three characteristic positions of the device of the invention;

FIGURE 6 shows the end of a film taken with a horizontal camera;

FIGURE 7 illustrates diagrammatically a constructional variant of the device shown in FIGURES 1 to 5;

FIGURE 8 is a diagram showing the distance of the projector from the screen as a function of the angle of the prism.

FIGURE 9 is a diagram showing the distance of the projector from the screen as a function of the spacing of the two images upon the screen.

FIGURE 10 is a diagrammatic perspective view illustrating the projected images upon a screen.

FIGURE 11 is a perspective view of another form of device made according to the invention;

FIGURE 12 is a radial longitudinal section of the device shown in FIGURE 11;

FIGURES 13, 14 and 15 are, respectively, sections taken on lines XIII—XIII; XIV—XIV; and XV—XV of FIGURE 12 and FIGURE 16 is a front end view looking in the direction of the arrow F of FIGURE 12.

In the embodiment of the invention shown in FIGURES 1 and 2, the device comprises two prisms 1 and 2 mounted in a box 3 carried on the end of a tube 4 and formed at the front with an opening covered by two polarizing plates 5 and 6. The two prisms 1 and 2 can be moved apart and positioned in an adjustable manner by any suitable device, which in FIGURE 2 comprises a screw 12 having a conical end disposed between the adjacent sides of the two prisms and two return springs 13 and 14. The angle α between the two prisms is varied by screwing or unscrewing the screw 12. The result is that the surfaces 7 and 8 of the prisms form between them an angle which can be adjusted according to the projection distance and the spacing to be provided between the two images superposed on the screen. The device is mounted on the lens panel 9 by the tube 4 which can, for example, be provided with a locking means (not shown) which may be of any suitable type and by which the device can be firmly fixed in any suitable position relatively to the objective. If the projector is provided with a single objective consisting of a window covering simultaneously two images, with normal drive on the film, the device according to the invention may be disposed, for example, in the position illustrated in front view in FIGURE 3. If the film is an ordinary film, two images may be superposed on the screen by polarizing them differently by the plates 5 and 6. In this way special projection will be obtained. Nevertheless, the images are reversed on the screen and, for this reason, it is necessary for the film to pass into the projector, i.e., the latter operates in reverse unless the film was taken with the camera reversed.

In similar circumstances, but starting with a film having successive pairs of images, each pair comprising one image for the left eye and one image for the right eye, stereoscopic relief will be obtained. In this connection it will be noted that the device according to the invention is very suitable for the projection of diapositives formed by two contiguous stereoscopic images.

A similar arrangement permits of correcting distortion of the images and thus of achieving unexpected results. For example, by turning the device through an angle of 45°, as shown in FIGURE 4, it is possible in an ordinary projector having a window of double height, to use a film produced by a camera having a double horizontal drive, as shown in FIGURE 6. When the film is passed through a normal projector having a window of double height, the latter will then enframe one image, the latter being turned through 90°. In the position illustrated in FIGURE 4, therefore, the apparatus will automatically correct distortion of the image and will then enable a normal projection on a wide screen to be obtained automatically.

Finally, if a normal projector and a normal film are used, the device may be disposed in the manner shown in front view in FIGURE 5. In this way the image is divided and spacial projection is obtained by correctly polarizing each projection. The spacing of the divided images is effected by adjusting the angle formed between the surfaces 7 and 8 of the prisms 1 and 2. In this case the image is also inverted on the screen but this is easily remedied, either by inverting the film in the projector, or by producing the film in a suitable way. The device above described may, in all cases, be replaced by the device shown in FIGURE 7 in which the prisms 1 and 2 are spaced apart and prisms 10 and 11 are interposed therebetween. These prisms may be fixed or adjustable according to the particular requirements. This device provides for normal projection without reversing or inverting the images.

It is obvious that the prisms may be replaced by suitably disposed mirrors.

The following mathematic formulae are applicable to the projection of double coupled images:

Let it be assumed that $g$=distance between the eyes
$M$=distance between the two images upon the screen.
$d$=distance of the viewer from the screen
$x$=distance at which the viewer sees the virtual image, which is the combination of two real homologue images upon the screen.

These quantities are interrelated by the following formulae:

$$x = \frac{d \cdot g}{g - M} \text{ and } M = g \cdot \frac{x - d}{x}$$

All these quantities are expressed in the same units, for example, millimeters.

In accordance with the present invention all the homologue points of the two images are shifted by the same quantity M. Due to the interposition of the prisms the viewer sees a virtual image projected into space outside of the screen at the distance $x$ which is determined by the above formulae.

Consequently, mathematically speaking, the eyes of an observer see merely a flat virtual image similar to that which would be projected upon the screen by an ordinary projector, but spaced from the screen since the image is located at a distance $x$ which is different from the distance $d$, the latter being the distance at which a viewer would see a real image upon the screen if ordinary projection were used.

It should be noted that the distance $x$ can have any desired value; it is merely necessary to determine M.

The "increase" of the virtual screen can be calculated from the size of the real screen. Let it be assumed that E' and E are at their respective dimensions; then the following formula is applicable:

$$\frac{E'}{E} = \frac{g}{g - M}$$

It is also necessary to determine the optima distance $d$ in such manner that the observer should always see the image, real or virtual, under the same angle at which the objective of the camera has seen it. This is indispensable to satisfy the rule of the plane perspective.

If $f$ and $F$ are the focal lines of the camera and the projector, respectively, and if P is the distance of the projector from the screen, i.e., the width of the auditorium, then it is apparent that $$d = P \times \frac{f}{F}$$

It should be noted that M is positive if it is of the same sign as $g$, i.e. if the visual axes do not intersect each other in front of the screen. If $x$ is negative, i.e. if M is greater than $g$, the virtual image will be produced behind the spectator. However, from a practical point of view this does not provide any difficulties, since the virtual image is shifted instinctively by the human brain.

As already stated, all the conjugated images are in the same plane outside of the screen, $x$, like M, being constant.

However, the three-dimensional appearance of an object located beyond a certain distance—which depends on the subject, the lighting conditions and conditions of contrast—will not be provided any more by the convergence of visual axes, but by visual habit, such as the relative size of the images upon the retina, relative movement of objects, etc.

On the other hand, for very close objects—and if the photograph is properly made—the three-dimensional appearance is provided by relating these objects to others which are further removed, by utilizing a wide angle objective, extending lines, large surfaces, etc., provided that the rules of perspective are complied with.

Practical experience has shown that if $x$ is between 15 and 20 meters, a well made photograph will have a three-dimensional appearance at all distances. Still better results are attained with a film showing the objects in movement along a direction close to that of an optical axis. This impression is further accentuated by upwardly or downwardly sloping views.

The best three-dimensional effects are attained if the virtual image is clear and without faults. The grain of the screen disappears and the image has the appearance of being mounted on glass, which may be described as the fluidity of the image.

The proper angle for the prisms can be determined on the basis of the following calculations:

A ray of light passing through a narrow prism close to its apex will be deviated toward the base of the prism by the angle $r$. If $p$ is the angle of the apex (diedre) of the prism and $n$ the refractory index in relation to air, then $$r = (n - 1) \times p$$

or $$p = \frac{r}{n - 1}$$

If P is the distance of the projector from the screen and M is the relative shifting between the two images, then $$\frac{M}{P} = 2r$$

wherein $r$ is expressed in radians.

For the glass of the prism $n=1.5$, and thus $$r = \frac{r}{0.5} = 2r = \frac{M}{P}$$

by replacing the value of M it follows that $$p = g \times \left(\frac{1}{P} - \frac{d}{P \times X}\right)$$

when M is smaller than $g$, and $$p = g \times \left(\frac{1}{P} + \frac{d}{P \times X}\right)$$

when M is greater than $g$.

On the other hand, it is necessary that $$d = P \times \frac{f}{F}$$

for the auditorium; in general $$\frac{f}{F} = \frac{1}{2} \text{ and } d = \frac{p}{2}$$

Thus it follows that (I) $$p = g \times \left(\frac{1}{p} - \frac{1}{2x}\right)$$

and (II) $$p = g \times \frac{1}{p} + \frac{1}{2x}$$

These symmetrical formulae show that P is preponderant if it is comparatively weak, namely, if the auditorium is of small depth.

As already stated, if M is negative, the virtual image is formed in front of the screen, which is convenient for long rooms if $x$ is adopted as being between 10 and 20 meters.

In accordance with the present invention, the value of $p$, i.e. the prism angle is 30′ or 1/115 radians. Then $$M = \frac{P}{115}$$

FIGURE 8 of the drawings is a diagram showing $p$ as a function of P which is traced in the following manner:

In the above Equations I and II, $x$ will be assumed as having the value of 15 meters, or $15 \times 10^3$ millimeters, and $g$ as having the average value of 60 millimeters; then (I′) $$p = \frac{60}{P} - \frac{1}{500}$$

and (II′) $$p = \frac{60}{P} + \frac{1}{500}$$

In the diagram of FIGURE 8, the ordinates are the reverse values of $p$ expressed in radians and minutes; the abscissae have three scales: P, P/4 and 3P/4; they correspond in principle to the depth of the auditorium, namely, to double the optimum distance of vision, then to the observer who is closest to the screen and, finally, to the one who is furthest removed from the screen.

Then the two curves shown in FIGURE 8 are obtained which are valid only for the subject of the present invention.

The area between the two curves is not suitable for the present invention, since M is too close to $g$, so that the observer would see the virtual screen at too great a distance, or at infiniti.

If on the diagram the value of $p$ is taken as 30′, it is apparent that for M smaller than $g$, P is smaller than 5 meters, while projectors for amateur films operate at a distance greater than 5.5 meters. Therefore, it is necessary to consider only the zone wherein M is greater than $g$.

P minimum should be about 8 meters and the viewers should be located within the range of between 2 meters and 6 meters from the screen. This value of P is the minimum for amateur presentations.

It should be also noted that there is a relation between M and $d$ which is set experimentally by the limits of the divergence of the visual axes. For normal vision $d$ should be greater than 10 meters. Since $M = P \times p$ and since $d$ must be also greater than $P/4$, it will be determined that $p$ must be smaller than 1/40. This is accomplished according to the present invention, since $p$ is equal to 1/115.

FIGURE 9 is a diagram showing M as a function of P. If we take into consideration the values adopted for $x$ (15 meters) and $d$ $$\left(\frac{P}{2}\right)$$

and if we start with the formula $$M = g\frac{x-d}{x}$$

then (1)  for $M$ smaller than $g$: $M = g\left(1\frac{P}{30}\right)$ (2)  for $M$ larger than $g$: $M = g\left(1 + \frac{P}{30}\right)$ P being in meters.

As shown in FIGURE 9, these are equations of two straight lines, having equal angular coefficients but opposite signs.

If we take into consideration the shaded "unusable" zone of P in FIGURE 8, it is possible to determine the minimum and maximum values of $g$ which correspond to the limits of this zone.

Furthermore, as already stated, for very long halls, namely, those longer than 30 meters, it is advantageous to use a negative $g$, so that the axes will intersect in front of the screen.

The diagram of FIGURE 9 confirms that if M is made greater than $g$, there is a much greater latitude in adopting the present invention to different lengths of halls for amateur presentations. In fact if M is smaller than $g$, as indicated by the line B′ B of FIGURE 9, M soon assumes a small value the result of which is that the virtual screen will be located too closely.

If an auditorium of predetermined length P is given, the variations of $x$ as a function of $d$ can be determined as follows:

If P and $p$ are given and M is a constant, it is apparent from the formula $$x = \frac{d \times g}{g - M}$$

that $x$ is directly proportional to $d$. In other words, the virtual screen is further removed from the real screen with the increase in the distance of the viewer from the real screen.

Thus with the values which have been adopted, for $d = P/2$, $x = 15$ meters; for $d = P/4$, $x = 7.5$ meters and for $d = 3P/4$, $x = 22.5$ meters.

As far as the increase in the size of the screen is concerned.

$$E' = E\frac{g}{g - M}$$

it is the same for all points of the auditorium.

It should be noted that the virtual screen is not a flat surface like the real screen. For example, if the viewer is located upon the optical axis of the projector, the shifting of two images M (at the center of the screen) diminishes in the direction toward the edges of the screen while $g$ remains constant, the viewer following the movements of the visual axis.

By using the general formula $$x = \frac{d \times g}{g - M}$$

the value of $x'$ may be calculated, the angle formed between the visual axis and the optical axis of the projection being designated as $a$:

$$d' = \frac{d}{\cos a}$$

$M' = M \cos a$; and the ratio $x'/x$ is equal to:

$$\frac{x'}{x} = \frac{1}{\cos a} \times \frac{M - g}{M \cos a - g}$$

for M greater than $g$, and $$\frac{x''}{x} = \frac{1}{\cos a} \times \frac{g - M}{g - M \cos a}$$

for M smaller than $g$.

It can be readily deduced from these calculations that the following conditions will prevail:

If M is smaller than $g$, the curvature will be directed toward the spectator, i.e., the virtual images will move away at a rate which is a function of the distance of real images from the center of the screen, for values of M ranging between $g/2$ and $g/1.9$; for all practical purposes this does not leave any margin of security.

If M is greater than $g$, the curvature will be directed toward the spectator for values of M ranging between $g$ and $10g$. Therefore, it is possible to obtain a substantial curvature.

By way of example, if $M=5g/4$ for $d=P/2$ it will be found that $x'/x=1.2$; this means that the edges of the screen will appear to be more distant than the center to the extent of 20%.

However, if $d=P/4$, it will be found that $x'/x=2.22$, which is a total setback of 120%.

From the above it is apparent that to spectators located close to the screen a picture will appear in true through relatively perspective, provided that the projected picture shows objects located upon the closest plane only in the center of the picture. The present invention makes it possible to see in relative relief in most instances objects the distance of which is at least 15 meters.

FIGURE 10 illustrates diagrammatically the actual projection of the two images upon a screen E from a projector attachment having the two prisms 1 and 2.

The embodiment of the projecting device according to the invention shown in FIGURES 11 to 16, comprises a tubular support 15, the rear part of which is formed with a shoulder 16 against which bears a screw-threaded ring 17 which enables the device to be fitted on a ring 18 by means of which the device can be fixed on the objective of a normal projection apparatus (not shown) the fixing being effected by at least one transverse screw 19.

In the tubular body 15 is fixed a ring 20 providing a common support for two semi-circular prisms 21 and 22.

In the same tubular body 15, in front of said prisms, is disposed with a smooth friction fit, against the internal wall of the cylindrical housing, a ring 23 acting as a support for two inverted polarizing plates 24 and 25 of semi-circular shape. To the wall of the ring 23 is fixed a pin 26 which passes through a slot 27 provided in the corresponding part of the tubular housing 15, and from which opening it projects sufficiently to provide for manipulation. On the front part of the tubular housing 15 are fixed diametrically opposite projections 28 and 29 traversed by support screws 30.

This compact device is fixed on the objective by means of the screw 19. In order to provide for suitable polarization of the images, the pin 26 is moved in one direction or the other until the correct polarization is obtained.

It is obvious that the prisms and the polarizing plates could be fixed in many ways different from that described and that the device itself could be fixed on the objective by means other than that described and illustrated.

In most cases the device according to the invention can be fitted equally well to picture taking apparatus and to projection apparatus. It can thus be used for the direct production of films or of fixed pictures for the different kinds of projection above described or to stereoscopic projections.

A device according to the invention can obviously be fitted with any usual accessories and be adapted for convenient handling.

It is apparent that the examples shown above have been given solely by way of illustration and not by way of limitation, and they are subject to many variations and modifications. All such variations and modifications are to be included within the scope of the present invention.

What is claimed is:

An attachment to a normal objective of a normal projection apparatus for producing three-dimensional images therewith, said attachment comprising a tubular support having a rear shoulder, a screw-threaded ring bearing against said support, another ring carrying the first-mentioned ring and fitting over the objective, a transverse screw carried by said other ring for fixing it upon the objective, a third ring fixed in said tubular support, two semi-circular prisms carried by the third ring, a fourth ring carried by said tubular support in front of said prisms, two inverted polarizing plates carried by said fourth ring, said tubular support having a slot formed therein, and a pin extending through said slot and fixed to said fourth ring.

References Cited by the Examiner

UNITED STATES PATENTS

| | | | |
|---|---|---|---|
| 1,589,761 | 6/1926 | Lord | 88—1 |
| 1,843,663 | 2/1932 | Cregier | 88—16.6 |
| 2,282,947 | 5/1942 | De Sherbinin | 88—16.6 |
| 2,314,174 | 3/1943 | Steinman | 88—16.6 |
| 2,674,919 | 4/1954 | Rodriguez | 88—16.6 X |
| 2,835,159 | 5/1958 | Rhea | 88—16.6 X |

FOREIGN PATENTS 525,427  8/1940  Great Britain.

JULIA E. COINER, *Primary Examiner.*

EMIL G. ANDERSON, NORTON ANSHER, *Examiners.*